United States Patent [19]

Cornet et al.

[11] Patent Number: 4,522,847
[45] Date of Patent: Jun. 11, 1985

[54] COATING VITREOUS SUBSTRATES

[75] Inventors: Julien Cornet, Temploux; Robert Van Laethem, Loverval, both of Belgium

[73] Assignee: Glaverbel, Brussels, Belgium

[21] Appl. No.: 490,164

[22] Filed: Apr. 29, 1983

[30] Foreign Application Priority Data

Apr. 30, 1982 [GB] United Kingdom ................. 8212670

[51] Int. Cl.³ .......................... B05D 3/06; B05C 11/00
[52] U.S. Cl. ...................................... 427/55; 427/165; 427/229; 427/380; 427/383.5; 118/67; 118/642; 118/643; 65/60.4; 65/60.51
[58] Field of Search ..................... 65/60.5, 60.51, 60.4; 427/55, 229, 380, 383.5, 165, 168, 377; 118/50.1, 65, 67, 315, 326, 641, 642, 643

[56] References Cited

U.S. PATENT DOCUMENTS 3,660,061 5/1972 Ponley et al. ........................ 428/432
4,240,816 12/1980 McMaster et al. ............... 65/60.5 X

FOREIGN PATENT DOCUMENTS 1516032 6/1978 United Kingdom .
1523991 9/1978 United Kingdom .
2078710 1/1982 United Kingdom ............... 65/60.51

Primary Examiner—John D. Smith
Assistant Examiner—Ken Jaconetty
Attorney, Agent, or Firm—Spencer & Frank

[57] ABSTRACT

A process for forming a metal or metal compound coating on a face of a hot vitreous substrate in sheet or ribbon form by continuously advancing the substrate in a downstream direction along a path through a coating station which discharging droplets of liquid coating precursor material in the downstream direction so that such material contacts the substrate at the coating station and continuously withdrawing vapors thereafter from the coating station in the downstream direction an annealing the substrate is characterized in that the hot coated substrate (1) passes from the coating station (3) to an annealing lehr (6) via a re-heating station (4) at which sufficient radiant heat energy is supplied to the hot coated substrate (1) to raise the temperature or the mean temperature of its coated surface at the re-heating station (4) through a certain temperature range, at least the upper end of such range being not less than a temperature 100° C. below the temperature or the mean temperature of such surface immediately before its contact by coating precursor material.

Apparatus for performing such a process is characterized in that at a position between the coating station (3) and the annealing lehr (6) there is a reheating compartment (4) which is separated from the coating station (3) by at least one boundary wall (13), which compartment (4) is provided with radiant heating means (10) for heating the substrate (1) as it advances past such compartment (4).

25 Claims, 1 Drawing Figure

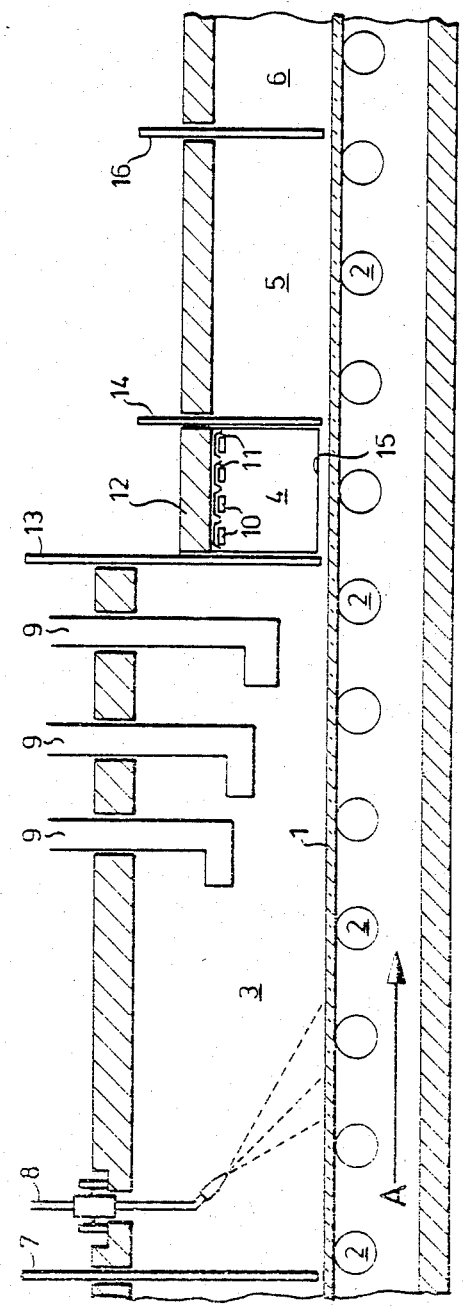

COATING VITREOUS SUBSTRATES

BACKGROUND OF THE INVENTION

The present invention relates to a process for forming a metal or metal compound coating on a face of a hot vitreous substrate in sheet or ribbon form by continually advancing the substrate in a given direction (hereafter called "downstream direction") along a path through a coating station, discharging droplets of liquid coating precursor material in the downstream direction so that such material contacts the substrate at said coating station, continuously withdrawing vapours from the coating station in the downstream direction and thereafter annealing the substrate.

Processes of the foregoing kind are used for example as described in British specification No. 1 516 032 for forming surface coatings which modify the apparent colour of the glass and/or which confer some other required property in respect of incident radiation, e.g. an infra-red-reflecting property.

The coating precursor material is applied in the liquid phase, for example in solution as described in British Patent Specification No. 1 523 991.

In some processes of the kind above referred to, the discharged coating precursor material is a single precursor substance, and in other such processes it comprises more than one coating precursor substance, for example a main coating constituent precursor and a coating additive precursor. Where more than one such precursor substance is discharged onto the substrate, they may be discharged in admixture, or separately for example as referred to in BFG Glassgroup's British Patent Application No. 81 18 611 (Publication No. GB 2 078 213A).

Processes as referred to are particularly useful for forming metal oxide coatings on ribbons of glass during their conveyance from a flat glass forming installation, e.g. a drawing machine or a float tank.

It is not easy to form coatings satisfying the high quality standards which the market sometimes demands.

One important problem which is encountered is non-uniformity in the adherence of the coating to the glass. Another problem is non-uniformity of the internal structure of the coating formed. It has been found that the difficulties posed by these problems increase with an increase in the rate of application of the coating precursor material, so that they are particularly severe when applying thick coatings and/or when the substrate is advanced rapidly through the coating station, for example when coating a freshly formed ribbon of float glass.

SUMMARY OF THE INVENTION

It is an object of the present invention to improve the uniformity of adherence and uniformity of structure of coatings formed by a process of the said foregoing kind.

According to the present invention, there is provided a process for forming a metal or metal compound coating on a face of a hot vitreous substrate in sheet or ribbon form by continuously advancing the substrate in a given direction (hereafter called "downstream direction") along a path through a coating station, discharging droplets of liquid coating precursor material in the downstream direction so that such material contacts the substrate at said coating station, continuously withdrawing vapours from the coating station in the downstream direction and thereafter annealing the substrate characterised in that the hot coated substrate passes from said coating station to an annealing lehr via a reheating station at which sufficient radiant heat energy is supplied to the hot coated substrate to raise the temperature or the mean temperature of its coated surface at said station through a certain temperature range, at least the upper end of such range being not less than a temperature 100° C. below the temperature or the mean temperature of such surface immediately before its contact by said coating precursor material.

The application of heat to the coated substrate in accordance with the invention has been found to result in an improved adherence of the coating to the substrate, involving a better weathering property, and has also been found to impart a more uniform structure to the coating. The more uniform coating structure is evidenced by an improved optical property, in particular a reduced light-diffusing property. It is believed that this is because the heating permits re-arrangement of coating crystals and/or gives rise to more favourable crystal growth conditions, and from this it is deduced that the absorption of heat energy which generally takes place when the coating precursor material reacts on the substrate has an effect on the way in which the coating crystals grow and adhere to the substrate.

The invention provides particularly important benefits when said coating precursor material is sprayed onto said substrate in solution as is preferred. This is probably because of the large amounts of heat energy removed from the substrate to heat and evaporate the solvent used. A specific example is the formation of a tin oxide coating by spraying a solution of a tin chloride, with or without other ingredients.

The invention is especially advantageous in embodiments in which said coating precursor material comprises a metal compound (preferably a tin chloride) from which a metal oxide coating is formed in situ by chemical reaction or decomposition, e.g. by pyrolysis, on contact with the hot ribbon. Glass bearing metal oxide coatings is used in large quantities as infra-red radiation screening glazings and for other purposes. For many purposes it is desirable for such oxide coatings to be several hundred nanometers in thickness. When forming a metal oxide coating it is preferred to maintain a non-reducing atmosphere at the re-heating station, in contact with the coating. Most suitably air or another oxidising atmosphere is maintained at that station because it is beneficial for there to be an excess of oxygen.

The invention is especially valuable for forming thick metal or metal compound coatings. In preferred embodiments the formed coating has a thickness of at least the fifth interferential order. The difficulty of forming uniform coatings hereinbefore described has been particularly in evidence when forming coatings of such thicknesses.

The coating rate may be relatively high so that the process is well suited for use in coating substrates which are moving quite quickly, for example continuously moving ribbons of freshly formed flat glass. In preferred processes according to the invention the substrate is advanced through the coating station at a speed of at least 2 meters per minute. It is very advantageous to employ the invention for forming a coating of at least the fifth interferential order of thickness on a substrate advancing at or above that speed.

The temperature or the mean temperature of the substrate at a position along the substrate path immediately before that at which the substrate is contacted by the coating precursor material is preferably 550° to 650° C. Generally, this temperature range is best suited to the formation of good quality optical coatings and notably metal oxide coatings, by pyrolysis.

Within the re-heat range above specified, the improvements resulting from the re-heating step tend generally to be greater as the re-heat temperature approaches the substrate surface temperature immediately before its contact by the coating precursor material, provided that the latter temperature is as favourable as possible to the deposition of a good quality coating at the coating station. The temperature range through which the temperature or the mean temperature of the coated substrate surface is raised at the re-heating station is preferably such that at least the upper end of that range is not less than a temperature 50° C. lower than the temperature or the mean temperature of such surface immediately before its contact by the coating precursor material. These conditions are recommended for achieving the best results in terms of the uniformity of the coating and its adherence to the substrate. The upper end of the aforesaid re-heat temperature range may in fact be above the said pre-contact temperature, but generally re-heating to that extent is not necessary.

For promoting the best results it is preferable for the upper end of said re-heat temperature range to be a temperature at which the material of the substrate has a mean viscosity in the range $10^{11}$ to $10^{12}$ poises. This condition is advantageous because in that viscosity range any residual internal mechanical stresses in the substrate are readily relievable preparatory to controlled annealing.

It is recommended to re-heat the coated substrate at the re-heating station by means of one or more radiant heaters emitting radiation at a black body temperature of 900° to 1600° C. That is a favourable condition from the heating efficiency standpoint. The metal compound coatings primarily of interest, particularly infrared-reflecting metal oxide coatings, have a relatively low emissivity and by using one or more radiant heaters emitting radiation in said black body temperature range it can be ensured that the radiation incident upon the coating is not or is not to any substantial extent reflected by the coating.

It is especially preferred that heat is supplied at the re-heating station to impart a predetermined temperature profile to the coated substrate across its width. The vitreous substrate can thereby be brought to an optimum condition for a following treatment. This preferred optional feature is particularly advantageous in the case where the substrate is a freshly formed ribbon of glass which is coated prior to annealing. It is especially desirable when annealing a ribbon of glass that the glass should have a smooth temperature profile across its width. It will be appreciated that the actual optimum temperature profile may vary with the glass composition and indeed with the method by which the ribbon is formed. For example when a freshly formed ribbon of drawn sheet glass enters an annealing lehr, a smoothly domed temperature profile is often desirable, with the centre of the ribbon up to 50° C. hotter than the edges. In the case of a float glass ribbon of similar composition, a lower temperature differential is normally desirable.

It is preferred that the substrate is passed from the re-heating station through a temperature stabilizing compartment to allow controlled modification of thermal temperature gradients within the substrate.

Advantageously, the speed of advance of the substrate and the length of the said temperature stabilising compartment are such that any increment of the substrate remains within that compartment for between 10 and 40 seconds. This allows sufficient time for a degree of temperature equalisation to be achieved and stabilised.

Preferably, the speed of advance of the substrate and the length of the re-heating station are such that any increment of the substrate remains within the re-heating station for between 5 and 20 seconds. It has been found that re-heating for a period of time within that range gives very good results. Less than 5 seconds is not really sufficient to achieve the full benefit of the invention and more than 20 seconds necessitates either a very long re-heating station or undersirably restricting the speed of travel of the substrate.

In some preferred embodiments of the invention, flame curtains are provided at each side of the substrate path at the re-heating station.

A method according to the invention may of course be used in the coating of sheets of glass, but it is of particular value where the substrate is a freshly formed ribbon of hot glass. Float glass in particular may be coated by a method according to the invention.

The invention includes apparatus which is suitable for performing the method defined above and it accordingly provides apparatus for forming a metal or metal compound coating on a face of a hot vitreous substrate in sheet or ribbon form, such apparatus comprising a coating station, means for continuously advancing the substrate in a given direction (hereafter called "downstream direction") along a path through the coating station and through an annealing lehr, delivery means for discharging droplets of liquid coating precursor material in the downstream direction so as to contact a substrate at said coating station, and means for continuously withdrawing vapours from the coating station in the downstream direction, characterised in that at a position between said coating station and said annealing lehr there is a compartment which is separated from said coating station be at least one boundary wall, which compartment (subsequently herein called "re-heating compartment") is provided with radiant heating means for heating the substrate as it advances past such compartment.

This is a simple and convenient apparatus for performing the method according to the invention.

Preferably there is a plurality of independently controllable radiant heaters at said re-heating station, arranged side-by-side across the width of the substrate path. Preferably, said heater(s) is or are adjustable in height above the substrate path. Adjusting the height of the heaters is a very simple way of controlling re-heating of the substrate.

Advantageously a temperature stabilising compartment is provided downstream from the re-heating compartment for allowing controlled modification of thermal gradients within the substrate.

In certain apparatus according to the invention use is made of one or more of the following features whose advantages will be apparent from what has been written above in regard to corresponding optional process features:

means is provided for supplying flame curtains at each side of the substrate path within the re-heating compartment;

conveyor means is provided for conveying the hot vitreous substrate directly from a vitreous ribbon forming installation to said coating station;

said ribbon forming installation is a float glass forming installation;

said coating and re-heating stations are located between a said ribbon forming installation and an annealing lehr.

BRIEF DESCRIPTION OF THE DRAWING

The present invention will now be described in greater detail with reference to the accompanying drawing which shows a schematic cut away side view of one apparatus for performing the present invention.

DESCRIPTION OF THE PREFERRED EMBODIMENTS

In the drawing, a ribbon of freshly formed glass 1 is conveyed by a conveyor 2 in the direction of arrow A from a ribbon forming installation (not shown) which may for example be of the Libbey Owens type for making sheet glass or of the float type. The ribbon 1 is conveyed along a tunnel-like structure in which there is a coating station 3, a re-heating compartment 4 and a stabilising compartment 5, followed by an annealing lehr 6.

The coating station 3 is closed off from the ribbon forming installation in known manner by a screen 7. Coating precursor substances are applied by a spray gun 8 which moves to and fro in a direction acrss the path of the ribbon. The spray gun discharges the precursor substances forwardly (i.e. in the downstream direction indicated by arrow A) and downwardly towards the glass ribbon, as indicated by the broken lines representing the spray. Vapours are sucked off by aspirators 9 having entrance openings extending the full width of the ribbon path so that the vapours do not mar the coating formed. Because of heat loss towards the sides of the chambers through which the ribbon has passed, its margins will generally be cooler than its central region and the whole of the ribbon will further be cooled by any endothermic reaction on the ribbon during formation of the coating. If the coating precursor substances are sprayed in solution, it will be appreciated that the ribbon will further be robbed of heat to the extent necessary for evaporating the solvent. The latent heat of evaporation of the solvent will also have a cooling effect on the ribbon. In consequence of these factors the temperature or the mean temperature of the ribbon may be brought below the minimum value which is required for forming a high quality coating with good adherence to the glass ribbon, and also to a temperature which is undesirably low for annealing purposes. The tendency for this to occur will of course be greater the larger is the quantity of solvent sprayed onto the ribbon, which quantity is generally related to the amount of solute and the thickness of the coating to be formed on the ribbon.

In accordance with the invention, the coated ribbon passes from the coating station into a re-heating compartment 4 in which it is heated by one or more radiant heaters 10 backed by reflectors 11 secured to the roof wall 12 of the tunnel-like structure. The re-heating compartment has upstream and downstream boundary walls 13,14 the former of which separates such compartment from the catong station 3. The re-heating compartment 4 can if desired be divided into a number of side-by-side sections by screens such as 15, each of such sections having one or more radiant heaters and reflectors 10, 11. This allows for a controlled variation of the radiant heat energy supply across the width of the ribbon, thereby to impart a predetermined transverse temperature profile to the coated ribbon.

Such a re-heat control can be effected in dependence on temperature measurements of portions of the ribbon surface between the coating and re-heating stations. Such measurements can readily be made using thermocouples. The re-heat control can be effected by independently controlling the radiant heat output from different radiant heaters or by raising or lowering such heaters.

The glass ribbon leaves the re-heating compartment 4 by passing under its downstream boundary wall 14 and enters the temperature stabilisation compartment 5 located between the downstream boundary wall 14 of the re-heating compartment and a further transverse wall 16. This stabilisation compartment is heat insulated and is long enough to allow heat conduction from the surface of the ribbon 1 to its interior. In addition the temperature stabilisation period appears often further to promote favourable crystal structure formation in the coating and also promotes a favourable temperature distribution to the ribbon for a subsequent annealing stage. After travelling below the downstream wall 16, the ribbon enters the annealing lehr 6, which is of known type.

If desired, flame curtains may be provided along the edges of the path followed by the ribbon in the re-heating compartment to reduce heat loss from the ribbon to the side walls.

The following is an example of a process according to the invention performed in an installation as above described and shown in the accompanying drawing:

EXAMPLE

The substrate 1 was a ribbon of freshly formed float glass conveyed directly from the float tank to the coating station 3. The speed of the ribbon was 9 meters per minute. The glass ribbon was 2.5 meters in width. At the position along the ribbon path coinciding with the screen 7, i.e. the position at which the ribbon enters the coating station, the top surface of the glass ribbon was at a temperature of 600° C. in the central portion of the ribbon width and 590° C. at its margins.

The spray gun 8 was set with its nozzle 25 cm above the top face of the glass ribbon and orientated so that its spray axis was inclined at 30° to the ribbon. The spray gun was continuously reciprocated transversely over the ribbon path at 10 cycles per minutes, the length of the transverse path of reciprocation being such that the spray cone from the nozzle swept the full width of the ribbon. At the zone along the ribbon path where it is intersected by the spray cone the top surface of the glass ribbon had a temperature of 600° C. at a central region of the ribbon width and a temperature of 590° C. at its margins.

The spray gun, which was of a conventional type, was fed with an aqueous solution of tin chloride obtained by dissolving in water 375 g per liter of hydrated tin chloride ($SnCl_2.2H_2O$) and adding 55 g per liter of $NH_4HF_2$. The spray gun was operated at an air (gauge) pressure of about 10 kg/cm². The delivery rate of the coating solution was adjusted to form a tin oxide coating doped by fluorine ions and having a thickness of 750 nm on the glass ribbon.

During the coating process suction forces were continuously maintained in the aspirators 9 by pump means (not shown) so that vapours which would otherwise accumulate above the freshly applied coating were continuously withdrawn.

The length of the coating station between the screens 7 and 13 was 4 meters. At the position along the ribbon path coinciding with the screen 13, i.e. the position where the coated ribbon enters the re-heating compartment 4, the coated glass surface had a temperature of 580° C. at a region centrally of the ribbon width and a temperature of 565° C. at its margins.

The re-heating compartment 4 had a length of 1.5 meters so that each increment of the glass ribbon remained in that compartment for 10 seconds. At the sides of this compartment there were flame curtains serving to insulate the compartment. The compartment was divided into nine side-by-side sections by screens such as 15. In each of those sections there were four parallel radiant heaters with reflectors as shown in the drawing, the heaters and reflectors extending across the width of the section. Each of the heaters was arranged to emit radiation at a black body radiation of between 900° C. and 1600° C. The effect of the radiant heaters was to raise the mean temperature of the coated ribbon surface during passage past the re-heating compartment. At the position along the ribbon path coinciding with screen 14, which is the downstream boundary wall of the re-heating compartment, the coated surface of the glass had a temperature of 585° C. in a region centrally of the ribbon width and a temperature of 575° C. at the ribbon margins. The glass temperature of 575° C. at the margins of the ribbon width corresponds with a glass viscosity of $10^{11.5}$ poises.

The temperature stabilisation compartment 5 had a length of 3 meters. The purpose of this compartment, separated as it is from the annealing lehr 6 by the screen 16, is to confine above the ribbon a space in which thermal gradients are restricted so that the coated ribbon surface is maintained for a period of time (about 20 seconds) without substantial drop in temperature. In fact in the actual process being described, the temperature of the glass measured at the location of screen 16 was 580° C. at the central region of the ribbon width and 575° C. at the ribbon margins.

The ribbon coating of tin oxide was of high optical quality, assessed by the proportion of transmitted incident light which was diffused by the coating, causing haze; which proportion was very small.

The effect of the re-heating step in modifying the structure of a coating was confirmed by two comparative tests. In the first test a process according to the foregoing Example was performed but with the spray gun discharging droplets dispersed over a wide size range including droplets in excess of 100 microns in size. In the second test the conditions were the same as in the first one except that the radiant heaters in the re-heating compartment 4 were switched off. The coating formed in the second test, i.e. without the re-heating step, exhibited numerous defects in the form of impression marks ("piquetage") caused by impacts of large droplets. The coating formed in the first test, i.e. with the aid of the re-heating step, was substantially free from such defects. That coating moreover was found to have a better adherence to the substrate than the coating formed without the re-heating step.

In the above Example of the invention the re-heating in the compartment 4 brought the mean temperature of the coated surface to within 20° C. of its temperature on entry into the coating station. With lowering of the reheat temperature the benefits of the re-heating step tend to become less marked but they remain significant within the re-heat range according to the invention.

We claim:

1. A process for forming a metal or metal compound coating on a face of a hot vitreous substrate in sheet or ribbon form by continously advancing the substrate in a given direction along a path through a coating station, discharging droplets of liquid coating precursor material in the given direction so that such material contacts the substrate at the coating station, continuously withdrawing vapours from the coating station in the given direction, and thereafter annealing the substrate in an annealing lehr, said process further comprising, before said step of annealing, passing the hot coated substrate (1) from the coating station (3) to the annealing lehr (6) via a re-heating station located ahead of the lehr (4), supplying, in the re-heating station, sufficient radiant heat energy to the hot coated substrate (1) to raise the temperature or the mean temperature of its coated surface, while the substrate is within said station, through a certain temperature range, at least the upper end of such range being not lower than a temperature 100° C. below the corresponding temperature of such surface immediately before its contact by said coating precursor material, and advancing the substrate through said re-heating station at a rate such that each increment of length of the substrate remains in said re-heating station for at least 5 seconds.

2. A process according to claim 1, wherein said step of discharging comprises spraying coating precursor material onto said substrate (1) in solution.

3. A process according to claim 1, wherein said coating precursor material comprises a metal compound for forming by pyrolysis a coating comprising an oxide of such metal.

4. A process according to claim 3, wherein said metal compound is a tin chloride.

5. A process according to claim 3, wherein the coating on the substrate (1) is exposed to a nonreducing atmosphere at said re-heating station (4).

6. A process according to claim 1, which is performed to form a said metal or metal compound coating having a thickness of at least the fifth interferential order.

7. A process according to clam 1, wherein the speed of advance of said substrate through the coating (3) and re-heating (4) stations is at least 2 meters per minute.

8. A process according to claim 1, wherein the temperature or the mean temperature of the substrate surface to be coated is 550° to 650° C. at a position along the substrate path immediately before that at which the substrate (1) is contacted by said coating precursor material.

9. A process according to claim 1, wherein at least the upper end of the temperature range through which the corresponding temperature of the coated substrate surface is raised at said re-heating station (4) is not less than a temperature 50° C. below the temperature or the mean temperature of such surface immediately before its contact by said coating precursor material.

10. A process according to claim 1, wherein at the upper end of said temperature range the material of the substrate has a mean viscosity in the range $10^{11}$ to $10^{12}$ poises.

11. A process according to claim 1, wherein said step of supplying heat energy at said re-heating station (4) is carried out by heating the coated substrate by one or more radiant heaters (10) emitting radiation at a black body temperature of 900° to 1600° C.

12. A process according to claim 1, wherein the heat energy supplied at the re-heating station (4) imparts a predetermined temperature profile to the coated substrate (1) across its width.

13. A process according to claim 1, wherein the substrate (1) is passed from the re-heating station (4) through a temperature stabilising compartment (5) to allow controlled modification of thermal gradients within the substrate.

14. A process according to claim 13, wherein the speed of advance of the substrate (1) and the length of said temperature stabilising compartment (5) are such that any increment of the substrate remains within that compartment for between 10 and 40 seconds.

15. A process according to claim 1, wherein the speed of advance of the substrate (1) and the length of the re-heating station (4) are such that any increment of the substrate remains within that station for between 5 and 20 seconds.

16. A process according to claim 1, wherein flame curtains are provided at each side of the substrate path at the re-heating station.

17. A process according to claim 1, wherein the substrate (1) is a freshly formed ribbon of hot glass.

18. A process according to claim 17, wherein the substrate is of float glass.

19. Apparatus for forming a metal or metal compound coating on a face of a hot vitreous substrate in sheet or ribbon form, such apparatus comprising a coating station, means for continuously advancing the substrate in a given direction along a path through the coating station, delivery means for discharging droplets of liquid coating precursor material in the given direction so as to contact a substrate at said coating station, and means for continuously withdrawing vapours from the coating station in the given direction, and an annealing lehr disposed for annealing the substrate as the substrate is being advanced along the path by said means for advancing and after the substrate has left said coating station, characterized in that at a position between said coating station (3) and said annealing lehr (6) there is a re-heating compartment (4) which is separated from said coating station (3) by at least one boundary wall (13), which re-heating compartment is provided with radiant heating means (10) for heating the substrate (1) as it advances through said re-heating compartment (4) in order to raise the temperature or the mean temperature of the coated surface of the substrate, while the substrate is within said re-heating compartment, through a certain temperature range, at least the upper end of such range being not lower than a temperature 100° C. below the corresponding temperature of such surface immediately before its contact by the coating precursor material, and said means for advancing are operative for advancing the substrate through said re-heating compartment at a rate such that each increment of length of the substrate remains in said re-heating compartment for at least 5 seconds.

20. Apparatus according to claim 19, wherein at said re-heating compartment (4) there is a plurality of independently controllable radiant heaters (1) which are arranged side-by-side across the width of the substrate path.

21. Apparatus according to claim 19, wherein said radiant heating means (1) is adjustable in height above the substrate path.

22. Apparatus according to claim 19, wherein in the given direction from said re-heating compartment (4) there is a temperature stabilising compartment (5) for allowing controlled modification of thermal gradients within the substrate.

23. Apparatus according to claim 19, wherein means is provided for supplying flame curtains at each side of the substrate path within the re-heating compartment.

24. Apparatus according to claim 19, wherein conveyor means (2) is provided for conveying the hot vitreous substrate directly from a vitreous ribbon forming installation to said coating station (3).

25. Apparatus according to claim 24 wherein said ribbon forming installation is a float glass forming installation.

* * * * *